United States Patent Office 3,101,819
Patented Aug. 27, 1963

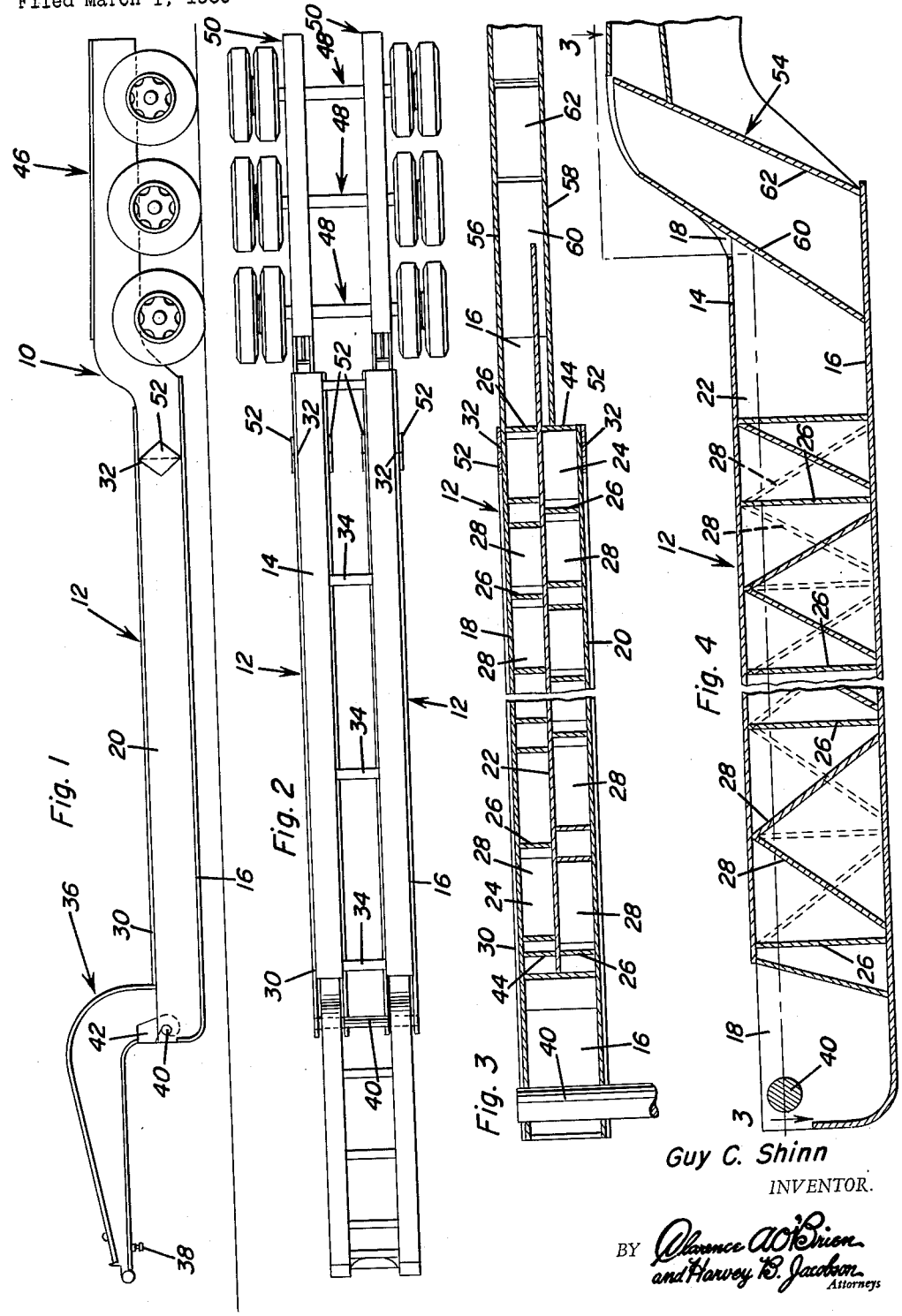

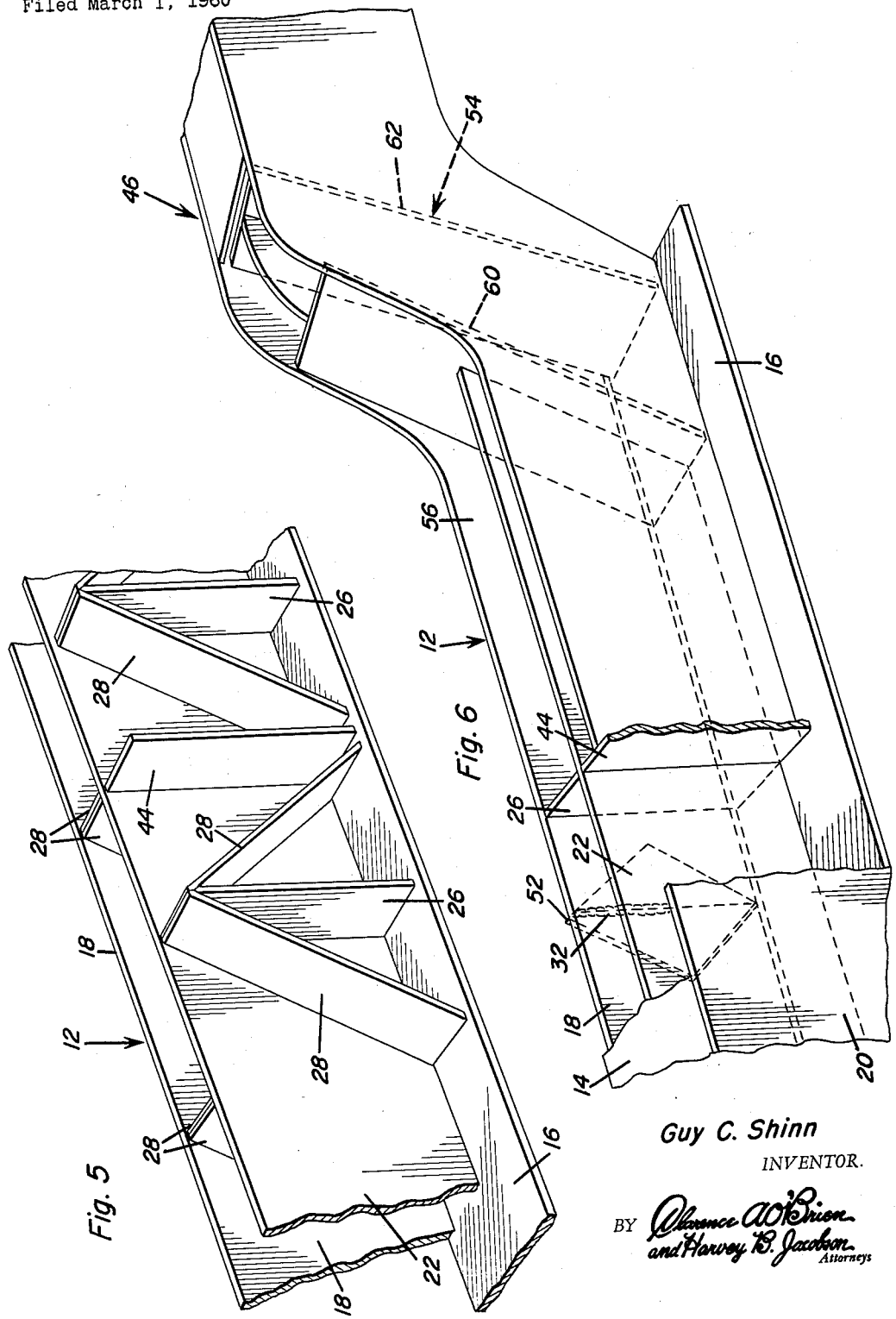

3,101,819
FABRICATED BEAM CONSTRUCTION
Guy C. Shinn, Box 308, Hamilton, Tex.
Filed Mar. 1, 1960, Ser. No. 12,091
8 Claims. (Cl. 189—37)

This invention relates to a novel and useful fabricated beam construction, and more particularly to a beam construction having a high strength to weight ratio and being particularly well adapted to support extremely heavy loads while in a horizontally disposed position.

A beam construction comprising the instant invention has been specifically designed for use as load beams in vehicles designed to carry extremely heavy loads. Vehicles and trailers that are designed for carrying extremely heavy loads must be designed expressly for their intended purpose. Although the beam construction of the instant invention may well be adapted for use in other environments, it is particularly well adapted for use as load beams for vehicles, trailers and the like. A vehicle or trailer designed to travel either on or off a prepared road bed must be capable of resisting lateral stresses as well as torsional stresses. Of course, if the weight of the beam construction were not important, many different forms of beams could be utilized with great effectiveness. However, especially when supporting extremely heavy loads, in order to remain within the maximum weight limitations set forth most of the roads in this country, it is most desirable to gain maximum strength and rigidity while still maintaining the weight of the beam construction at a minimum.

It is therefore the main object of this invention to provide a fabricated beam construction which will be particularly well adapted for carrying extremely heavy loads and which will also be well adapted for use as the load beam or beams of vehicles and trailers which are capable of travelling over ground surfaces which have not been prepared as a road bed as well as prepared road surfaces.

A further object of this invention, in accordance with the immediately preceding object, is to provide a fabricated beam construction which will be capable of supporting extremely heavy loads while the beam is disposed horizontally.

Still another object of this invention, in accordance with the preceding objects, is to provide a fabricated beam construction which will be extremely light in comparison to the load it is capable of supporting.

Another object of this invention, in accordance with the preceding objects, is to provide a fabricated beam construction which will be particularly well adapted to be spliced so that load beams of various shapes may be conveniently formed as need without sacrificing the rigidity of the load beam and without increasing the weight of the load beam excessively because of extensive splicing structures.

A final object to be specifically enumerated herein is to provide a fabricated beam construction which will conform to conventional forms of manufacture so as to provide a beam construction which will be economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a semi-trailer construction with the fabricated beam construction of the present invention being utilized as the main load beam for the semi-trailer;

FIGURE 2 is a top plan view of the semi-trailer construction shown in FIGURE 1;

FIGURE 3 is a fragmentary horizontal sectional view taken substantially upon the plane indicated by the section line 3—3 of FIGURE 4;

FIGURE 4 is an enlarged fragmentary vertical sectional view of one of the load beams of the trailer illustrated in FIGURES 1 and 2, parts of the beam and trailer being broken away;

FIGURE 5 is an enlarged fragmentary perspective view of a portion of the fabricated beam construction of the instant invention, with parts of the beam construction being removed to show the structural details of the beam; and FIGURE 6 is a further fragmentary enlarged sectional view of the fabricated beam construction with parts of the structure being broken away to show the manner in which the beam construction may be readily spliced.

Referring now more specifically to the drawings, the numeral 10 generally designates a semi-trailer construction utilizing a pair of load beams each generally designated by the reference numeral 12 whose construction comprises the instant invention. Each of the load beams 12 is substantially identical and therefore the specific construction of only one of these beams will be set forth.

The beam 12 includes elongated, horizontally disposed, spaced and substantially parallel top and bottom plates 14 and 16 respectively which are interconnected along their corresponding longitudinal edges by means of a pair of spaced and substantially parallel side plates 18 and 20. It is to be understood that the side plates 18 and 20 will be secured between the top and bottom plates 14 and 16 in any suitable manner such as by welding.

It is to be noted that the top, bottom and side plates form a box-like beam and with particular attention directed to FIGURES 3, 5 and 6 of the drawings it will be noted that there is also secured between the top and bottom plates 14 and 16 a center web 22 which is disposed between the side plates 18 and 20 and extends substantially parallel to the side plates 18 and 20. With the provision of the center web 22, the beam 12 is made into a double section box beam.

Disposed in each of the beam sections 24 between the center web 22 and the side plates 18 and 20 are disposed a plurality of longitudinally spaced and substantially vertically disposed baffle plates 26. It is to be understood that the baffle plates 26 may be secured between the adjacent surfaces of the top and bottom plates 14 and 16 and the center web 22 and adjacent side plate by any convenient means such as welding. It will be noted, see FIGURE 5 in particular, that the vertical baffle plates 26 of each beam section 24 are staggered relative to the baffle plates 26 of the other beam section 24 so that the baffle plates 26 of one beam section 24 are positioned longitudinally of the load beam 12 between adjacent baffle plates 26 of the other beam section 24 of the load beam 12.

Secured in each beam section 24 between adjacent vertical baffle plates 26 in that beam section are a pair of oppositely inclined baffle plates 28 with the corresponding inclined baffle plates 28 of adjacent pairs of inclined baffle plates being oppositely inclined. Further, corresponding pairs of inclined baffle plates 28 of the beam sections 24 are transversely aligned but the corresponding baffle plates 28 of each pair of transversely aligned baffle plates 28 are oppositely inclined.

Although the load beams 12 are constructed similarly throughout substantially their entire length, it is of course realized that the ends of a load beam must be specifically adapted in one way or another to engage a supporting member. With particular attention directed to FIGURE 1 of the drawings, it is to be understood that other than certain variations which will be herein after more fully set forth, that the load beam 12 includes structures such as that hereinbefore set forth between points 30 and 32.

It is to be noted that the semi-trailer 10 illustrated in the drawing utilizes two load beams 12 which are substantially parallel and are interconnected by means of suitable transversely extending brace members 34 which may be secured between the adjacent surfaces of the beams 12 in any convenient manner.

The portion of the load beam 12 beyond the point 30 is specifically adapted to have removably secured thereto a gooseneck assembly generally referred to by the reference numeral 36 which is provided with a fifth wheel pin 38 for connection with the fifth wheel or a tractor vehicle (not shown). The hook 42 of the gooseneck is removably engaged with a transverse shaft 40 which is secured between the side plates 18 and 20 and the pair of load beams 12.

With particular attention directed to FIGURE 3 of the drawings as well as FIGURE 5, it will be noted that the rearward and forwardmost of the staggered vertical baffle plates 26 has secured in alignment therewith in the other beam section 24 a similar baffle plate 44. Further, additional similar baffle plates 44 may be positioned in each of the beam sections 24 in alignment with one of the baffle plates in the other beam section 24 at strategic points or at spaced distances throughout the longitudinal length of the load beam 12 if it is desired.

The load beams 12 illustrated in the drawings comprise the main load beams of a low boy semi-trailer construction 10. The wheeled suspension assembly of the semi-trailer 10 is generally designated by the reference numeral 46 and includes a plurality of wheeled axle assemblies generally designated by the reference numeral 48. The suspension assembly 46 also includes a pair of longitudinally extending spaced support beam generally designated by the reference numeral 50 which are spliced at their forward ends to the rear ends of the load beams 12 by means of butt welds at points 32 and a diamond shaped reinforcement plate 52.

It is to be understood that any means may be utilized for supporting the rear ends of the load beams 12 but that in the form of drop center semi-trailer 10 illustrated in the drawings a stiffener assembly generally designated by the reference numeral 54 is used at the juncture between corresponding support beams 50 and load beams 12 inasmuch as the load beams 12 are disposed substantially lower than the support beams 50. The support beams 50 each include opposite side walls 56 and 58 with the side wall 56 being in substantial alignment with the side plate 18 and joined at the point 32 by means of a butt weld and the diamond shaped reinforcement plate 52 which is secured over the juncture between the side wall 56 and the side plate 18 on the outside surfaces thereof by any convenient means such as welding. The purpose of the diamond shaped reinforcement plate is to distribute any stresses at the point 32 of the butt weld in four directions. The side plate 20 terminates at the point 32 at the rear end thereof and the side wall 58 of the support beam 50 abuts against the rear face of the baffle plate 44 and is secured thereto in any convenient manner such as by welding.

The stiffener assembly 54 includes a pair of inclined stiffening plates 60 and 62, and the center web, in the case of the low boy semi-trailer construction 10 illustrated in the drawings, extends beyond the butt welds at the point 32 and abuts against the inclined forward surface of the inclined stiffening plate 60 and is secured thereto in any convenient manner such as by welding. In this manner, an extremely rigid semi-trailer 10 is formed by the use of the load beams 12 and the load beams 12 are capable of supporting extremely heavy loads in comparison to their weight.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fabricated beam construction comprising horizontally disposed, vertically spaced planar and substantially parallel top and bottom plates, a pair of planar side plates secured between and to corresponding side edge portions of said top and bottom plates forming a box-like beam, a longitudinally extending planar center web plate substantially parallel to said side plates and spaced therebetween secured between and to said top and bottom plates forming a double section box beam, and a plurality of upstanding substantially transversely extending and longitudinally spaced baffle plates secured between and to the top and bottom plates and between the center web and the adjacent side plates of each of said beam sections.

2. The combination of claim 1 wherein said baffle plates in one beam section are staggered and spaced longitudinally of said beam construction between adjacent baffle plates in the other beam section.

3. The combination of claim 1 wherein said baffle plates are inclined and successive plates are oppositely inclined.

4. The combination of claim 3 wherein the inclined baffle plates of one beam section are transversely aligned with the corresponding baffle in the other beam section and said transversely aligned baffles are oppositely inclined.

5. The combination of claim 1 wherein some of said baffle plates are substantially vertically disposed, said vertically disposed baffle plates in one beam section being staggered and spaced longitudinally of said beam construction between adjacent vertical baffle plates in the other beam section, inclined baffle plates secured in each of said beam section between adjacent vertical plates.

6. The combination of claim 5 wherein there are a pair of inclined baffle plates disposed between adjacent vertical baffle plates with the inclined plates of said pair of plates being oppositely inclined.

7. The combination of claim 6 wherein corresponding inclined baffle plates of successive pairs of inclined baffle plates in one beam section are similarly inclined.

8. The combination of claim 7 wherein successive pairs of inclined baffle plates of one beam section are transversely aligned with successive pairs of inclined baffle plates of the other beam section and corresponding inclined plates of said aligned pairs of inclined plates are oppositely inclined.

References Cited in the file of this patent
UNITED STATES PATENTS

| | | |
|---|---|---|
| 608,861 | Horton | Aug. 9, 1898 |
| 1,090,171 | Schisler | Mar. 17, 1914 |
| 1,991,682 | Kahn | Feb. 19, 1935 |
| 2,083,226 | Dornier | June 8, 1937 |
| 2,256,885 | Bruss | Sept. 23, 1941 |
| 2,297,123 | Almdale | Sept. 29, 1942 |
| 2,622,895 | Larsen | Dec. 23, 1952 |
| 2,812,192 | Cole | Nov. 5, 1957 |
| 2,968,412 | Hill | Jan. 17, 1961 |